(12) United States Patent
Yonetani et al.

(10) Patent No.: US 9,239,964 B2
(45) Date of Patent: Jan. 19, 2016

(54) SURFACE SHAPE MEASUREMENT METHOD, SURFACE SHAPE MEASUREMENT APPARATUS, NON-TRANSITORY COMPUTER-READABLE STORAGE MEDIUM, OPTICAL ELEMENT, AND METHOD OF MANUFACTURING OPTICAL ELEMENT

(71) Applicant: CANON KABUSHIKI KAISHA, Tokyo (JP)

(72) Inventors: Yuki Yonetani, Utsunomiya (JP); Yasunori Furukawa, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 153 days.

(21) Appl. No.: 13/761,490

(22) Filed: Feb. 7, 2013

(65) Prior Publication Data

US 2013/0202215 A1    Aug. 8, 2013

(30) Foreign Application Priority Data

Feb. 7, 2012   (JP) ................. 2012-023974

(51) Int. Cl.
*G06K 9/46*      (2006.01)
*G06K 9/50*      (2006.01)
(Continued)

(52) U.S. Cl.
CPC ............... *G06K 9/50* (2013.01); *G01B 11/255* (2013.01); *G01M 11/005* (2013.01); *G06K 9/46* (2013.01)

(58) Field of Classification Search
CPC ........ G01B 11/24; G01B 21/20; G01B 11/26; G01B 9/02083; G01B 2210/52; G01B 9/02057; G01B 9/02085; G01B 2290/45; G01B 9/02021; G01B 27/0025; G01B 11/25; G01M 11/025; G01M 11/005; G01M 11/0271; G01M 11/0207; G01M 11/0242; G01M 11/00; G01M 11/0221; A61C 9/006; G06T 7/0042; G03F 7/70358; G03F 7/7085; G03F 7/70066; G03F 7/70883; H01L 21/681; G01J 9/00; G02B 27/0025; A61B 3/107; A43G 4/20; B24B 9/14; G05B 2219/45157
USPC .......... 382/203; 356/496, 511, 513, 515, 601; 702/85, 167
See application file for complete search history.

(56) References Cited

U.S. PATENT DOCUMENTS 5,604,583 A * 2/1997 Byron .................... B23Q 17/24
346/125
5,960,379 A * 9/1999 Shimizu ............... G01B 11/255
356/511

(Continued)

FOREIGN PATENT DOCUMENTS

JP    2006-030016 A    2/2006

OTHER PUBLICATIONS

Pfund et al. "NonNull testing of rotationally symmetric aspheres: a systematic error assessment," Applied Optics/ vol. 40 No. 4/ Feb. 1, 2001, pp. 439-446. © 2001 Optical Society of America.

(Continued)

*Primary Examiner* — Vu Le
*Assistant Examiner* — Aklilu Woldemariam
(74) *Attorney, Agent, or Firm* — Rossi, Kimms & McDowell LLP

(57) ABSTRACT

A surface shape measurement method that divides a surface shape of an object (107) into a plurality of partial regions (201, 202, 203, 204) to obtain partial region data and that stitches the partial region data to measure the surface shape of the object, and the method includes the steps of calculating sensitivity of an error generated by a relative movement between the object and a sensor (110) for each of the partial regions, dividing the surface shape of the object into the plurality of partial regions to obtain the partial region data, obtaining the partial region data, calculating an amount corresponding to the error using the sensitivity, correcting the partial region data using the amount corresponding to the error, and stitching the corrected partial region data to calculate the surface shape of the object.

14 Claims, 7 Drawing Sheets

(51) Int. Cl.
  *G01B 11/255* (2006.01)
  *G01M 11/00* (2006.01)

(56) References Cited

U.S. PATENT DOCUMENTS

| | | | | |
|---|---|---|---|---|
| 6,781,700 | B2* | 8/2004 | Kuchel | G01B 11/2441 356/512 |
| 6,972,849 | B2* | 12/2005 | Kuchel | G01B 11/2441 356/513 |
| 7,605,926 | B1* | 10/2009 | Hetzler | G01M 11/0221 356/515 |
| 8,244,066 | B2* | 8/2012 | Ives | G01B 11/25 250/310 |
| 8,593,615 | B2* | 11/2013 | Sasaki | G01B 11/2441 355/55 |
| 2003/0128348 | A1* | 7/2003 | Nishi | G03F 7/70358 355/53 |
| 2004/0257669 | A1* | 12/2004 | Koehler | G02B 13/143 359/676 |
| 2006/0118703 | A1* | 6/2006 | Wegmann | G01J 9/00 250/216 |
| 2008/0218713 | A1* | 9/2008 | Shibazaki | G03F 7/70516 355/52 |
| 2010/0141958 | A1* | 6/2010 | Hasegawa | G01B 11/24 356/511 |
| 2010/0209832 | A1* | 8/2010 | Matsuda | G03B 27/52 430/30 |
| 2010/0220336 | A1* | 9/2010 | Liu | G01B 9/0209 356/511 |
| 2011/0032503 | A1* | 2/2011 | Sasaki | G01B 11/2441 355/72 |
| 2011/0075120 | A1* | 3/2011 | Ichinose | G03F 7/70775 355/53 |
| 2011/0112785 | A1* | 5/2011 | Nakauchi | G01B 11/2441 702/85 |
| 2011/0119011 | A1* | 5/2011 | Yamazoe | G01B 11/2441 702/85 |
| 2011/0141484 | A1* | 6/2011 | Arnold | G01B 9/021 356/512 |
| 2012/0013916 | A1 | 1/2012 | Osaki | |

OTHER PUBLICATIONS

Floriot et al. "Surface metrology with a stitching Shack-Hartmann profilometric head," Proc. of SPIE vol. 6616, 66162A(2007) Downloaded From: http://spiedigitallibrary.org/ on Nov. 26, 2012 Terms of Use: http://spiedl.org/terms.

German Office Action for corresponding DE102013001948.6, mail date May 13, 2014. English translation provided.

* cited by examiner

SURFACE SHAPE MEASUREMENT METHOD, SURFACE SHAPE MEASUREMENT APPARATUS, NON-TRANSITORY COMPUTER-READABLE STORAGE MEDIUM, OPTICAL ELEMENT, AND METHOD OF MANUFACTURING OPTICAL ELEMENT

BACKGROUND OF THE INVENTION

1. Field of the Invention

The present invention relates to a surface shape measurement method that divides a surface shape of an optical element so as to measure the surface shape.

2. Description of the Related Art

As a method of measuring a surface shape of an object surface (an optical element), particularly an aspherical lens, without contacting the surface at high speed, Jahannes Pfund, Norbert Lindlein and Johannes Schwider, "NonNull testing of rotationally symmetric aspheres: a systematic error assessment," App. Opt. 40 (2001) p. 439 discloses a method of illuminating light of a spherical wave onto an object surface via an optical system to measure reflected light of the object surface using the Shack-Hartmann sensor of a light receiving unit. In a method of disclosing in Japanese Patent Laid-Open No. 2006-30016, in accordance with a diameter of the object or an aspherical surface amount (a deviation from the spherical surface), a wavefront that exceeds a size of the diameter of the Shack-Hartmann sensor needs to be measured. In this case, in view of reducing the size and the cost of a measurement apparatus, a method of dividing a sensor incident wavefront into partial regions to perform a division measurement and then performing a data processing to stitch each of division measurement data (partial region data) is suitably used (a stitching method). In the data processing of the stitching method, correcting an error generated by the division measurement is important.

In Japanese Patent Laid-Open No. 2006-30016 and J. Floriot, X. Levecq, S. Bucourt, M. Thomasset, F. Polack, M. Idir, P. Mercère, S. Brochet, and T. Moreno, "Surface metrology with a stitching Shack-Hartmann profilometric head," Proc. of SPIE Vol. 6616, 66162A(2007), measurement apparatuses that perform a measurement using the stitching method using the Shack-Hartmann sensor are disclosed. In Japanese Patent Laid-Open No. 2006-30016, a method of removing an error caused by an inclination of a sensor of errors contained in each the division measurement data is disclosed. In J. Floriot, X. Levecq, S. Bucourt, M. Thomasset, F. Polack, M. Idir, P. Mercère, S. Brochet, and T. Moreno, "Surface metrology with a stitching Shack-Hartmann profilometric head," Proc. of SPIE Vol. 6616, 66162A(2007), a method of removing an error caused by a defocus component in addition to the inclination error of the sensor is disclosed.

However, in the methods disclosed in Japanese Patent Laid-Open No. 2006-30016 and J. Floriot, X. Levecq, S. Bucourt, M. Thomasset, F. Polack, M. Idir, P. Mercère, S. Brochet, and T. Moreno, "Surface metrology with a stitching Shack-Hartmann profilometric head," Proc. of SPIE Vol. 6616, 66162A (2007), position displacements in an optical axis plane of the sensor and in an optical axis direction and an error caused by a rotation displacement around the optical axis (an error generated by a relative movement between an object and a sensor) cannot be corrected. In addition, a correction accuracy of the error generated by the relative movement between the object and the sensor is deteriorated.

SUMMARY OF THE INVENTION

The present invention provides a surface shape measurement method and a surface shape measurement apparatus that perform a stitching after correcting an error generated by a relative movement between an object and a sensor so as to be capable of measuring a surface shape of the object with high accuracy. In addition, the present invention provides a non-transitory computer-readable storage medium that stores the computer program for causing an information processing apparatus to execute the surface shape measurement method, an optical element that is manufactured by using the surface shape measurement method, and a method of manufacturing the optical element.

A surface shape measurement method as one aspect of the present invention divides a surface shape of an object into a plurality of partial regions to obtain partial region data and stitches the partial region data to measure the surface shape of the object, and the method includes the steps of calculating sensitivity of an error generated by a relative movement between the object and a sensor for each of the partial regions, dividing the surface shape of the object into the plurality of partial regions to obtain the partial region data, obtaining the partial region data, calculating an amount corresponding to the error using the sensitivity, correcting the partial region data using the amount corresponding to the error, and stitching the corrected partial region data to calculate the surface shape of the object.

A surface shape measurement apparatus as another aspect of the present invention measures a surface shape of an object, and includes a sensor configured to receive reflected light obtained by illuminating light onto the object via an optical system, and a processor configured to divide the surface shape of the object into a plurality of partial regions to obtain partial region data, and to stitch the partial region data to calculate the surface shape of the object, and the processor is configured to perform steps of calculating sensitivity of an error generated by a relative movement between the object and the sensor for each of the partial regions, dividing the surface shape of the object into the plurality of partial regions to obtain the partial region data, obtaining the partial region data, calculating an amount corresponding to the error using the sensitivity, correcting the partial region data using the amount corresponding to the error, and stitching the corrected partial region data to calculate the surface shape of the object.

A non-transitory computer-readable storage medium as another aspect of the present invention stores a computer program for causing an information processing apparatus to execute a surface shape measurement method that divides a surface shape of an object into a plurality of partial regions to obtain partial region data and that stitches the partial region data to measure the surface shape of the object, and the surface shape measurement method includes the steps of calculating sensitivity of an error generated by a relative movement between the object and a sensor for each of the partial regions, dividing the surface shape of the object into the plurality of partial regions to obtain the partial region data, obtaining the partial region data, calculating an amount corresponding to the error using the sensitivity, correcting the partial region data using the amount corresponding to the error, and stitching the corrected partial region data to calculate the surface shape of the object.

An optical element as another aspect of the present invention is manufactured by processing an object surface of the object based on measurement data obtained using the surface shape measurement method.

A method of manufacturing an optical element as another aspect of the present invention is a method of manufacturing the optical element that is manufactured by processing an object surface of the object based on measurement data obtained using the surface shape measurement method.

Further features and aspects of the present invention will become apparent from the following description of exemplary embodiments with reference to the attached drawings.

DESCRIPTION OF THE PREFERRED EMBODIMENTS

Figure 1:
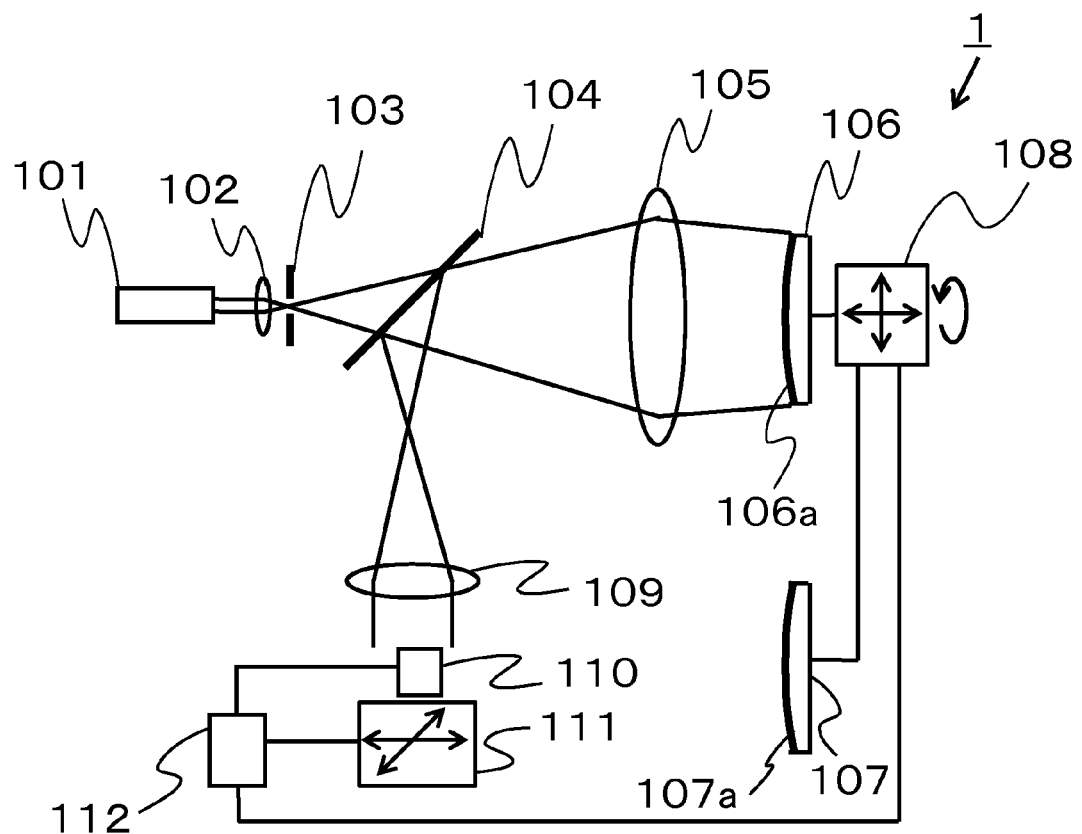
FIG. 1 is a configuration diagram of a surface shape measurement apparatus in Embodiment 1.

Exemplary embodiments of the present invention will be described below with reference to the accompanied drawings. In each of the drawings, the same elements will be denoted by the same reference numerals and the duplicate descriptions thereof will be omitted.

[Embodiment 1]

First of all, referring to FIG. 1, Embodiment 1 of the present invention will be described. FIG. 1 is a configuration diagram of a surface shape measurement apparatus 1 in the present embodiment. In FIG. 1, reference numeral 101 denotes a light source, reference numeral 102 denotes a condenser lens, reference numeral 103 denotes a pinhole, reference numeral 104 denotes a half mirror, and reference numeral 105 denotes a transmitter lens. Reference numeral 106 denotes a reference lens, and one of surfaces of the reference lens 106 is a reference surface 106a. Reference numeral 107 denotes a lens to be measured (an object to be measured), and one surface of the lens 107 is an object surface 107a (a surface to be measured). Reference numeral 108 denotes a driver that adjusts a position and an inclination of the reference lens 106 and the lens 107. Reference numeral 109 denotes an imaging lens, reference numeral 110 denotes a sensor, reference numeral 111 denotes a driver that drives the sensor 110, and reference numeral 112 denotes an analyzing processor (a processor). A Z-axis is parallel to an optical axis of a wavefront that enters the sensor 110, and an X-axis and a Y-axis are determined to be perpendicular to the Z-axis. The X-axis and the Y-axis are orthogonal to each other. In the surface shape measurement apparatus 1, an optical system configured by the condenser lens 102, the pinhole 103, the half mirror 104, the transmitter lens 105, and the imaging lens 109.

Light from the light source 101 is condensed into the pinhole 103 by the condenser lens 102. A spherical wave from the pinhole 103 transmits through the half mirror 104, and then becomes converged light by the transmitter lens 105. The converged light is reflected on the reference surface 106a or the object surface 107a to be measured, and transmits through the transmitter lens 105 and then is reflected on the half mirror 104, and further transmits through the imaging lens 109 and enter the sensor 110. Thus, the sensor 110 receives the reflected light that is obtained by illuminating the light onto the lens 107 (the object surface 107a) via the optical system.

In order to improve an imaging performance of the optical system, the condenser lens 102, the transmitter lens 105, and the imaging lens 109 may also be configured by using a lens unit including a plurality of lenses, instead of using a single lens as illustrated in FIG. 1. When a diameter of a light beam or a numerical aperture is changed, a collimator lens or the like may also be inserted into the optical system if needed. The light source 101 is a monochromatic laser, a laser diode, or a light emitting diode. The pinhole 103 only has to generate an ideal spherical wave with a small spatial noise, and a single-mode fiber can also be alternatively used.

Each of the transmitter lens 105 and the imaging lens 109 is configured by a plurality of lenses. A focal length, a radius of curvature, and a diameter of each of the lenses, and a magnification of the optical system configured by combining the transmitter lens 105 and the imaging lens 109 are determined by a diameter (an effective diameter) and a radius of curvature of the object surface 107a, and a size of a light receiving part of the sensor 110. In order to put the lens 107a that is a convex surface closer to a conjugate plane with respect to the sensor 110, the transmitter lens 105 and the imaging lens 109 are designed so that Petzval sum is negative. When an aspherical surface amount of the lens 107 is large, a range of the aspherical surface shape that can be measured is limited in a set of transmitter lenses 105. In this case, accordance with a design value (the effective diameter, the radius of curvature, and the aspherical surface amount) of the object surface 107a, for example one or both of the transmitter lens 105 and the imaging lens 109 may be changed (altered).

The lens 107 is disposed at a position where the conjugate plane with respect to the sensor 110 and the object surface 107a are nearly coincident with each other on the optical axis. Since the conjugate plane with respect to the sensor 110 and the object surface 107a are nearly coincident with each other, the overlap of the rays is not generated for the reflected light from the object surface 107a. Therefore, a wavefront slope distribution of the light entering the sensor 110 can be measured with high accuracy. The term "nearly coincident" means not only a case where the conjugate plane with respect to the sensor 110 and the object surface 107a are exactly coincident with each other, but also a case where these are considered to be substantially coincident with each other.

The convergent spherical wave is illuminated on the object surface 107a. An angle distribution of the reflected light from the object surface 107a depends on a surface shape error of the object surface 107a. When the object surface 107a is an aspherical surface, this angle distribution depends on the aspherical surface amount. In particular, when the aspherical surface amount is large, the angle is significantly different from an incident angle onto the object surface 107a.

The reference lens 106 is a lens that is manufactured by using the same design value as that of the lens 107. The reference lens 106 is previously measured with high accuracy using another measurement apparatus such as a probe type measurement apparatus. Surface shape data of the reference lens 106 is stored in the analyzing processor 112. It is preferred that the reference lens 106 have the reference surface 106a processed with high accuracy. It is preferred that the lens 107 be processed so that a difference from the surface shape of the reference lens 106 is not more than around a few micrometer.

The positions and the inclinations of the reference lens 106 and the lens 107 are adjusted by the driver 108. This adjustment is performed so that each coefficient of an inclination component of the Zernike coefficient obtained by performing a fitting by a differential form of the Zernike polynomial (the differential Zernike polynomial) for the wavefront slope distribution on the sensor 110, a defocus component, and a coma aberration component is not more than a target value. As described below, error sensitivity may also be made with respect to the drive of each lens. In this case, the adjustment of the lens is performed by the fitting using the error sensitivity for the difference between the wavefront slope distribution on the sensor and an actual wavefront slope distribution on the lens on conditions that the lens is at a target position and a target inclination.

The sensor 110 is generally called the Shack-Hartmann sensor, which is configured by a micro lens array that has a large number of micro condenser lenses that are arrayed in lattice patterns and an image pickup element that is represented by a CCD. A wavefront transmitting through the micro condenser lenses is condensed onto the image pickup element (the sensor) for each micro condenser lens. The wavefront slope distribution of the light that enters the sensor 110 is obtained by detecting the difference between a position of a spot condensed by the micro lens array and a position that is previously corrected, for example a position of a spot obtained by an incident parallel light. Performing the above processing for all the micro condenser lenses, the slope distribution can be measured in a plane perpendicular to the optical axis of the wavefront that is received by the sensor 110, i.e. for each of an X direction and a Y direction. The sensor 110 is not limited to the Shack-Hartmann sensor, but a different type of sensor may also be used if it can measure the wavefront slope distribution. For example, the Shearing interferometer or the Talbot interferometer that is configured by the Hartmann plate or a diffraction grating and a light receiving sensor represented by the CCD can also be adopted.

When the object surface 107a is processed with a desired accuracy, a lateral coordinate at which a correction processing is performed and a correction processing amount are calculated based on a difference between surface shape measurement data and a desired shape, and the correction processing is performed by a correction processing machine. However, since a position distribution (the lateral coordinate) of the measured ray angle distribution is a position distribution of the sensor 110, this needs to be converted into a coordinate of the object surface 107a in order to perform the correction processing. An angle difference between the reference surface 106a and the object surface 107a that is measured by the sensor 110 is different from a reflection angle difference of the light between the reference surface 106a and the object surface 107a. Therefore, performing the conversion also for this angle difference, the shape of the object surface 107a can be measured with higher accuracy.

In the present embodiment, for the ray position distribution and the angle distribution on the sensor 110, the conversion is performed using a position magnification distribution and an angle magnification distribution respectively, and the ray position distribution and the angle distribution on the conjugate plane with respect to the sensor 110, i.e. on the object surface 107a, are obtained. However, in accordance with the shape of the object surface 107a, the conjugate plane with respect to the sensor 110 and the object surface 107a may not be coincident with each other. In this case, performing a ray tracing calculation, the conversion onto the object surface 107a is performed. In accordance with required measurement accuracy, the conversion may be performed on condition that the angle magnification distribution is constant.

When a diameter of the light beam that enters the sensor 110 is larger than the size of an opening of the sensor 110, the division measurement of the wavefront slope distribution is performed while the sensor 110 is moved by the driver 111 in the light receiving surface (an X-Y plane), and then the obtained wavefront slope distributions may be joined. In order to join the distributions, i.e. perform the stitching, with high accuracy, the influence on the measurement caused by an error (a drive error of the sensor 110) that is generated by the drive of the driver 111, i.e. a relative movement between the sensor 110 and the lens 107, needs to be removed. The drive error of the sensor 110 contains position shift errors in X, Y, and Z directions and angle shift errors around X, Y, and Z axes with reference to each division measurement position (a lattice design) previously set.

The driver 111 only has to include at least an XY stage, and it may also include a Z stage, a rotation mechanism around the X axis, a rotation mechanism around the Y axis, and a rotation mechanism around the Z axis. In order to perform a calibration or the like, the translation movement in the Z direction in addition to the X and Y directions and the rotation movement around the X, Y, and Z axes may also be performed.

The analyzing processor 112 is connected to the sensor 110, the driver 108, and the driver 111, which performs a drive command in aligning the reference lens 106 or the lens 107, an input/output processing of data, and an arithmetic processing. The analyzing processor 112 also performs a ray tracing calculation or a drive command at the time of the stitching processing, and a correction calculation of the error generated by the stitching processing. In the stitching processing, the analyzing processor 112 sends a first drive command to the driver 111, and the driver 111 moves the sensor 110 to a first drive position. After the movement of the sensor 110 is completed, the analyzing processor 112 sends an obtaining command of condensing spot intensity data to the sensor 110. The condensing spot intensity data obtained by the sensor 110 is processed by the analyzing processor 112, and first wavefront slope distribution data are obtained. The first drive position and the first wavefront slope distribution data are stored in the analyzing processor 112. Repeating the similar processing by N times (second, third, . . . ), N kinds of stage positions and N kinds of wavefront slope distribution data are stored. The N kinds of wavefront slope distribution data obtained as above are joined, i.e. the stitching is performed, and therefore whole of the wavefront slope distribution data can be obtained.

Figure 2A:
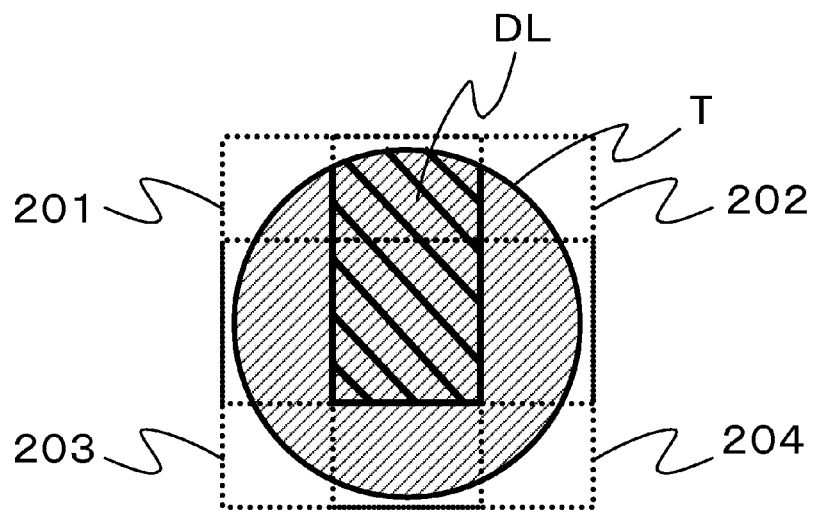
FIGS. 2A and 2B are schematic diagrams in performing a division measurement of an object surface in Embodiment 1.
Figure 2B:
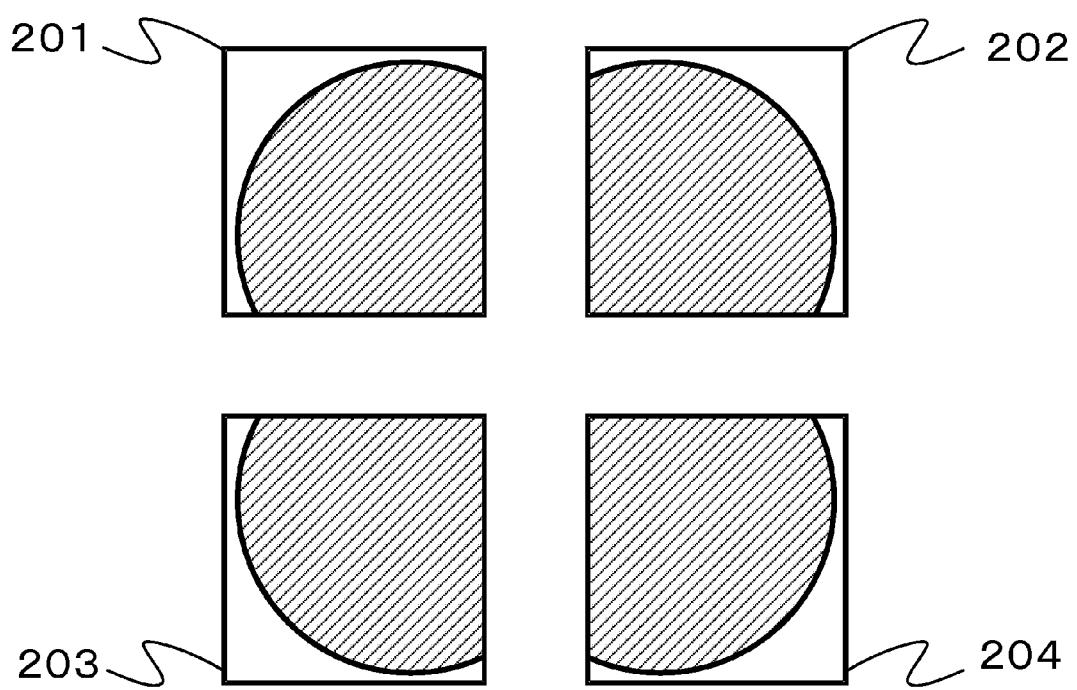

Next, an error correcting method and a joining method (a stitching method) in the present embodiment will be described. FIGS. 2A and 2B are schematic diagrams in performing a divisional measurement of an object to be measured. In FIG. 2A, a region in a circle indicated by a solid line is a wavefront T that is to be measured (a surface to be measured). Regions 201 to 204 indicated by dotted lines are a plurality of divided partial regions (division measurement regions, a lattice design). The regions 201 to 204 illustrated in FIG. 2B are obtained by separating each of the regions 201 to 204 illustrated in FIG. 2A. In FIGS. 2A and 2B, a maximum value of a size of the divide measurement region is a size of the opening of the sensor 110. The whole of the wavefront T that is to be measured cannot be measured by each of the regions 201 to 204 solely. However, combining the regions 201 to 204, the whole of the wavefront T that is to be measured can be covered. In the example illustrated in FIGS. 2A and 2B, the slope distribution data (the wavefront slope distribution) of the wavefront T that is to be measured in the X direction and the Y direction in the plurality of partial regions that are represented as the regions 201 to 204 are joined (stitched).

The wavefront slope distribution measured in each partial region of the regions 201 to 204 contains the drive error and the system error of the sensor 110 in performing the division measurement. The system error is an error that is originally derived from the sensor 110 such as a manufacturing error, which is an error common to partial measurement data.

Next, with regard to the error correcting method and the stitching method in the present embodiment will be specifically described using a numerical expression. The i-th division measurement data (partial region data) of the wavefront slope distributions in the X direction and the Y direction are denoted by $S'_{xi}$ and $S'_{yi}$, and wavefront slope distributions that do not contain errors are denoted by $S_{xi}$ and $S_{yi}$ (symbol "i" denotes an integer from 1 to N). The drive errors of six components, i.e. basis functions in the X direction and the Y direction that represent position displacements in the X, Y, and Z directions and angle displacements around each axis are denoted by $f_{xj}$ and $f_{yj}$, and their coefficients (drive error coefficients) are denoted by $a_{xj}^i$ and $a_{yj}^i$. Symbol "j" (j=1 to 6) corresponds to the position displacements in the X, Y, and Z directions and the angle displacements around each axis. Symbols $E_{sysx}$ and $E_{sysy}$ denote differential components in the X direction and the Y direction of the system error of the sensor 110, respectively. Symbol $(x_i, y_i)$ denotes an i-th drive position of the sensor 110. Defining the symbols as above, the division measurement data $S'_{xi}$ and $S'_{yi}$ are approximately represented as the following Expression (1).

$$S'_{xi}(x - x_i, y - y_i) = \qquad (1)$$
$$S_{xi}(x - x_i, y - y_i) + \sum_{j=1}^{6} a_{xj}^i f_{xj}(x - x_i, y - y_i) + E_{sysx}(x - x_i, y - y_i)$$

$$S'_{yi}(x - x_i, y - y_i) = S_{yi}(x - x_i, y - y_i) +$$
$$\sum_{j=1}^{6} a_{yj}^i f_{yj}(x - x_i, y - y_i) + E_{sysy}(x - x_i, y - y_i)$$

In this case, instead of obtaining the drive error in each of the X direction and the Y direction, the coefficients $a_{xj}^i$ and $a_{yj}^i$ are assumed to be values equal to each other in the X direction and the Y direction. In other words, the drive error coefficient is calculated on the assumption that $a_{xj}^i = a_{yj}^i = a_j^i$ is met. When the two expressions in the X and Y direction in Expression (1) are represented as one expression, the expressions can be represented as the following Expression (2).

$$S'_i(x - x_i, y - y_i) = \qquad (2)$$
$$S_i(x - x_i, y - y_i) + \sum_{j=1}^{6} a_j^i f_j(x - x_i, y - y_i) + E_{sys}(x - x_i, y - y_i)$$

In this case, symbols $S'_i$, $S_i$, $f_j$, and $E_{sys}$ are represented as the following Expression (3).

$$S'_i = \begin{pmatrix} S'_{xi} \\ S'_{yi} \end{pmatrix}, S_i = \begin{pmatrix} S_{xi} \\ S_{yi} \end{pmatrix}, f_j = \begin{pmatrix} f_{xj} \\ f_{yj} \end{pmatrix}, E_{sys} = \begin{pmatrix} E_{sysx} \\ E_{sysy} \end{pmatrix} \qquad (3)$$

The basis function $f_j$ is that represents the drive error of the sensor 110 is complicated as the aberration of the optical system or the shape error or the aspherical surface amount of the lens 107 is increased, and it is difficult to be exactly described by the numerical expression. Therefore, instead of the basis function $f_j$ of the drive error of the sensor 110, sensitivity (error sensitivity) that is obtained by the ray tracing calculation, an actual measurement on the surface shape measurement apparatus 1, or the like is used.

The sensitivity is a sensitivity of the wavefront slope distribution on the surface of the sensor 110 with respect to the drive error for each of the six components of the sensor 110. Specifically, the sensitivity is calculated by obtaining the difference that is obtained by subtracting the wavefront slope distribution obtained when the sensor 110 is not driven from the wavefront slope distribution obtained when the sensor 110 is driven in each component direction by a unit amount at each division measurement position (each partial region). In other words, the sensitivity is calculated by obtaining the difference between data obtained when the lens 107 and the sensor 110 are relatively moved by a predetermined amount and data obtained when the lens 107 and the sensor 110 are not relatively moved.

The wavefront slope distributions when the sensor 110 is driven in each component direction are denoted by $Sg_{xj}$ and $Sg_{yj}$, and the wavefront slope distributions when the sensor 110 is not driven are denoted by $Sg_{x0}$ and $Sg_{y0}$. In this case, sensitivities $g_{xj}$ and $g_{yj}$ are represented as the following Expression (4).

$$g_{xj}(x - x_i, y - y_i) = Sg_{xj}(x - x_i, y - y_i) - Sg_{x0}(x - x_i, y - y_i)$$
$$g_{yj}(x - x_i, y - y_i) = Sg_{yj}(x - x_i, y - y_i) - Sg_{y0}(x - x_i, y - y_i) \qquad (4)$$

When the sensitivities $g_{xj}$ and $g_{yj}$ in the X direction and the Y direction are summarized by one expression (a sensitivity $g_j$), the sensitivity $g_j$ are represented as the following Expression (5).

$$g_j = \begin{pmatrix} g_{xj} \\ g_{yj} \end{pmatrix} \qquad (5)$$

Thus, in the present embodiment, instead of the basis function $f_j$ that is difficult to be introduced, the sensitivity that is previously calculated is used. It is preferred that the sensitivity that is used for the correction of the drive error be used for all the six components. However, when the drive error in a predetermined direction can be ignored, the number of the components of the sensitivity may be reduced. The drive error contains at least one error of the position errors between the lens 107 and the sensor 110 in the X, Y, and Z directions and the rotation errors around the X, Y, and Z axes, and a sensitivity which is needed to correct at least the one error only has to be calculated.

In the present embodiment, the sensitivity is calculated using the ray tracing calculation that uses design values of the lens 107 and the optical system. In other words, first of all, a position displacement and an angle displacement of unit amounts are given to the sensor 110 by a calculator (an information processing apparatus), and the wavefront slope distribution on the surface of the sensor 110 is calculated. Subsequently, the wavefront slope distribution on the surface of the sensor 110 when the position displacement and the angle displacement do not exist is calculated. Then, subtracting the wavefront slope distribution on the surface of the sensor 110 when the position displacement and the angle displacement do not exist from the wavefront slope distribution on the surface of the sensor 110 when the position displacement and the angle displacement exist, the difference distribution can be obtained. Thus, the difference distribution corresponding to each division measurement region (each partial region) that is designed as a lattice design is adopted as the sensitivity for each measurement position.

In the example of FIGS. 2A and 2B which illustrates the case of N=4, in order to minimize an overlap error between the region 201 and the region 202, a value of $a^i_j$ may be determined so as to minimize a value of $\Delta_{12}$ that is represented by the following Expression (6).

$$\Delta_{12} = \sum_{1 \cap 2}[S'_1(x-x_1, y-y_1) - S'_2(x-x_2, y-y_2)]^2 \quad (6)$$

In Expression (6), "1∩2" indicates a region where the region 201 and the region 202 of FIGS. 2A and 2B are overlapped with each other, which corresponds to a shaded region DL in FIG. 2A. In Expression (6), the overlap error between the region 201 and the region 202 can be reduced, but an overlap error of other division measurement data cannot be reduced. Therefore, Expression (6) is extended to all the division measurement data, and a value of $\Delta$ is defined as the following Expression (7).

$$\Delta = \sum_{s=1}^{N}\sum_{t=1}^{N}\sum_{s \cap t}[S'_s(x-x_s, y-y_s) - S'_t(x-x_t, y-y_t)]^2 \quad (7)$$

In Expression (7), N is the number of the division measurement data, and N is equal to 4 (N=4) in FIGS. 2A and 2B.

In the present embodiment, the coefficient $a^i_j$ may be determined so as to minimize the value of $\Delta$. As a method of determining the coefficient $a^i_j$, a common least-square method can be used. In other words, in order to minimize the value of $\Delta$, a value that is obtained by differentiating the value of $\Delta$ by the coefficient $a^i_j$ only needs to be zero. Accordingly, the following Expression (8) only needs to be met. In this calculation, the sensitivity $g_j$ is used as the basis function $f_j$.

$$\frac{\partial \Delta}{\partial a^i_j} = 0 \quad (8)$$

Since there are six components of the sensitivity for fitting the drive error, six kinds (j=1, 2, . . . , 6) of coefficients $a^i_j$ exist for each partial region (i=1, 2, 3, 4). Therefore, based on Expression (8), a simultaneous equation of 24 dimensions (4×6=24) can be obtained. This simultaneous equation is represented as the following Expression (9).

$$Y = DA \quad (9)$$

In Expression (9), symbol Y denotes a vector of 24 rows and 1 column, symbol D denotes a vector of 24 rows and 24 columns, and symbol A denotes a vector of 24 rows and 1 column. The vector Y is represented as the following Expression (10).

$$Y = \begin{pmatrix} \Delta S_1 \\ \Delta S_2 \\ \vdots \\ \Delta S_N \end{pmatrix}, \quad (10)$$

$$\Delta S_i = \sum_{k=1}^{N}\sum_{i \cap k}\begin{pmatrix} \begin{bmatrix} S'_k(x-x_k, y-y_k) - \\ S'_i(x-x_i, y-y_i) \end{bmatrix} g^i_1(x-x_i, y-y_i) \\ \begin{bmatrix} S'_k(x-x_k, y-y_k) - \\ S'_i(x-x_i, y-y_i) \end{bmatrix} g^i_2(x-x_i, y-y_i) \\ \vdots \\ \begin{bmatrix} S'_k(x-x_k, y-y_k) - \\ S'_i(x-x_i, y-y_i) \end{bmatrix} g^i_6(x-x_i, y-y_i) \end{pmatrix}$$

The vector D is represented as the following Expression (11).

$$D = \begin{pmatrix} D_{1,1} & -D_{1,2} & \cdots & -D_{1,N} & -D_1 \\ -D_{2,1} & D_{2,2} & & & -D_2 \\ \vdots & & \ddots & & \vdots \\ -D_{N,1} & & & & -D_N \\ -D_1^T & -D_2^T & \cdots & -D_N^T & D_C \end{pmatrix} \quad (11)$$

In Expression (11), symbol T of a superscript indicates a transposed matrix. When symbol M is the number of components of the drive errors to be corrected, symbol $D_{i,j}$ is a matrix of M rows and M columns. Since the present embodiment describes the case where all the six components are corrected (M=6), symbol $D_{i,j}$ is a matrix of 6 rows and 6 columns. When a value of i is not equal to a value of j (i≠j), a component of s-th row and t-th column in $D_{i,j}$ is represented as the following Expression (12).

$$\sum_{i \cap j} g^i_s(x-x_i, y-y_i) g^j_t(x-x_j, y-y_j) \quad (12)$$

When the value i is equal to the value of j (i=j), the component of s-th row and t-th column in $D_{i,j}$ is represented as the following Expression (13), where k≤N is defined.

$$\sum_{k \neq i}\sum_{i \cap k} g^i_s(x-x_i, y-y_i) g^j_t(x-x_j, y-y_j) \quad (13)$$

Symbol $D_i$ denotes a matrix of M rows and (L−M) columns, and a component of s-th row and t-th column in $D_i$ is represented as the following Expression (14).

$$\sum_{j \neq i}\sum_{i \cap j} g^i_s(x-x_i, y-y_i)[g^j_{M+t}(x-x_j, y-y_j) - g^i_{M+t}(x-x_i, y-y_i)] \quad (14)$$

Symbol $D_c$ denotes a matrix of (L−M) rows and (L−M) columns, and a component of s-th row and t-th column of symbol S is represented as the following Expression (15).

$$-\frac{1}{2}\sum_{i=1}^{N}\sum_{j=1}^{N}\sum_{i \cap j}[g^j_{M+s}(x-x_j, y-y_j) - g^i_{M+s}(x-x_i, y-y_i)] \cdot \quad (15)$$

$$[g^j_{M+t}(x-x_j, y-y_j) - g^i_{M+t}(x-x_i, y-y_i)]$$

The vector A is represented as the following Expression (16).

$$A = \begin{pmatrix} A_1 \\ A_2 \\ \vdots \\ A_N \end{pmatrix}, \quad (16)$$

$$A_i = \begin{pmatrix} a_1^i \\ a_2^i \\ \vdots \\ a_6^i \end{pmatrix}$$

In order to obtain an unknown coefficient vector A, Expression (9) described above only needs to be resolved.

Performing singular value decomposition for the matrix D, the following Expression (17) can be obtained.

$$D = USV^\dagger \quad (17)$$

Symbol "†" denotes a transposed conjugate (adjoint), symbol U denotes a unitary matrix, and symbol S denotes a diagonal matrix. Using "−1" in order to represent an inverse matrix, the relation of $U^{-1}=U\dagger$ is met. Symbol V has characteristics in which V†V is a unit matrix. Using the singular value decomposition, a common inverse matrix D' of the matrix D is represented by the following Expression (18).

$$D' = VS^{-1}U^\dagger \quad (18)$$

In order to solve Expression (9) described above using Expression (18), the following Expression (19) may be performed.

$$A = VS^{-1}U^{\dagger Y} \quad (19)$$

Using Expression (19), an unknown coefficient vector A can be obtained. In other words, a coefficient that is used to correct the drive error can be obtained.

In order to correct the drive error in the X direction and the Y direction using the calculated coefficient, the following Expression (20) may be used.

$$\Psi_i(x-x_i, y-y_i) = S_i'(x-x_i, y-y_i) - \sum_{j=1}^M a_j'^i f_j(x-x_i, y-y_i) \quad (20)$$

In Expression (20), symbol $a''_j$ denotes the calculated coefficient of the drive error. Symbol $\Psi_i$ is a vector that has i-th corrected partial measurement data $\Psi_{xi}$ and $\Psi_{yi}$ in the X direction and the Y direction arrayed in a column direction. In the present embodiment, the drive error may also be corrected by performing a coordinate transformation and an interpolation using the calculated drive error, instead of using Expression (20). The coordinate transformation may be performed by applying a translation-rotational matrix.

A whole of final wavefront slope distribution is obtained by performing an average calculation. In the i-th division measurement data, a function which indicates 1 for a region that has the data and indicates 0 for a region that does not have the data is denoted by $h_i$. Furthermore, symbol H that is obtained by adding the functions $h_i$ is defined as the following Expression (21).

$$H(x, y) = \sum_{i=1}^N h_i(x-x_i, y-y_i) \quad (21)$$

For example, the region of H=2 means that two kinds of data are overlapped with each other, and the region of H=3 means that three kinds of data are overlapped with each other. Using the symbol H, the whole of the final wavefront slope distribution Ψ is represented by the following Expression (22).

$$\Psi(x, y) = \frac{\left[\sum_{i=1}^N \Psi_i(x-x_i, y-y_i)\right]}{H(x, y)} \quad (22)$$

$$[H(x, y) \neq 0]$$

Using Expression (22), in the region where the data are overlapped with each other, the influences of a random noise or an error caused by reproducibility or the like of a measurement device can be reduced by an averaging effect. Furthermore, a step at the joined part (the stitched part) can be reduced by the averaging effect. In the present embodiment, a simple average is used as a method of obtaining the whole of the wavefront slope distribution, but the embodiment is not limited to this. For example, a method of performing the average calculation with the weighting for each of the partial measurement data, a method of adopting only one of the division measurement data in the overlapped region instead of the average, or the like, may also be used.

Performing the calculations up to Expression (22) for the reference surface 106a and the object surface 107a, the whole of the wavefront slope distribution in which the drive error of the sensor 110 is removed can be calculated. When the system error $E_{sys}$ of the sensor 110 that cannot be ignored exists, the coefficient obtained using Expression (19) receives the influence of the system error $E_{sys}$. In this case, the drive error of the sensor 110 is shifted from the value to be corrected, and therefore the correction result by Expression (20) may be overcorrected. However, when a difference measurement is performed, the influence of the overcorrection caused by the system error $E_{sys}$ is canceled. In other words, the drive error can be corrected without receiving the influence of the system error $E_{sys}$.

Next, the whole of the wavefront slope distributions on the surface of the sensor 110 for the calculated reference surface 106a and object surface 107a are converted onto the object surface 107a. Using a lookup table (a position magnification distribution, and an angle magnification distribution) that indicates relations between ray positions and angles on the surface of the sensor 110 and the object surface 107a that have been previously calculated, the data on the surface of the sensor 110 are converted onto data on the conjugate plane with respect to the sensor 110, i.e. data on the object surface 107a. The lookup table is obtained by the ray tracing calculation using design values of the object surface 107a and the optical system. The lookup table can also drive the reference lens 106 so as to calculate the relative relation of the wavefront slope distributions on the surface of the sensor 110 and the object surface 107a in the apparatus. As the lookup table, only the position magnification distribution is used while the angle magnification distributions on the surface of the sensor 110 and the object surface 107a are constant, or both the position magnification distribution and the angle magnification distribution are used, which may be selected in accordance with the required measurement accuracy. Thus, the division magnification data (the partial region data) are obtained by measuring the wavefront slope distribution from the object surface 107a while the conjugate plane with respect to the sensor 110 and the object surface 107a coincide with each other, and by using the position magnification distribution on the conjugate plane with respect to the sensor 110 or both the position magnification distribution and the angle magnification distribution.

However, in accordance with the object surface 107a, there is a case where the conjugate plane with respect to the sensor 110 and the object surface 107a do not coincide with each other. In this case, the ray tracing calculation is performed from the conjugate plane with respect to the sensor 110 to the object surface 107a. In other words, after performing the conversion onto the conjugate plane with respect to the sensor 110, furthermore, the conversion onto the object surface 107a is performed using the ray tracing calculation, and thus the conversion from the surface of the sensor 110 to the object surface 107a is possible.

Next, using the whole wavefront slope distribution data of the reference surface 106a and the object surface 107a converted onto the object surface 107a, the shape of the object surface 107a is calculated. First of all, a difference wavefront slope distribution is calculated. When the whole wavefront slope distribution data of the reference surface 106a is $S_{base}$, and the whole wavefront slope distribution data of the object surface 107a is $S_{test}$, a difference wavefront slope distribution $\Delta S$ that is a difference of the slope distributions is represented as the following Expression (23).

$$\Delta S = S_{test} - S_{base} \tag{23}$$

The difference wavefront slope distribution $\Delta S$ is a value that is obtained by differentiating the surface shape difference between the reference surface 106a and the object surface 107a. Therefore, integrating the difference wavefront slope distribution $\Delta S$, the difference shape between the reference surface 106a and the object surface 107a can be calculated. As this integration method, there is a method of using a differential function of the basis function that indicates the wavefront and performing the fitting for the difference wavefront slope distribution $\Delta S$ so as to multiply the obtained coefficient by the basis function (a modal method), or a method of adding the difference wavefront slope distribution $\Delta S$ (a zonal method). Finally, in addition, the shape of the reference surface 106a that has been previously measured by another measurement apparatus is added to the difference shape, and thus the shape of the object surface 107a can be calculated.

Figure 3:
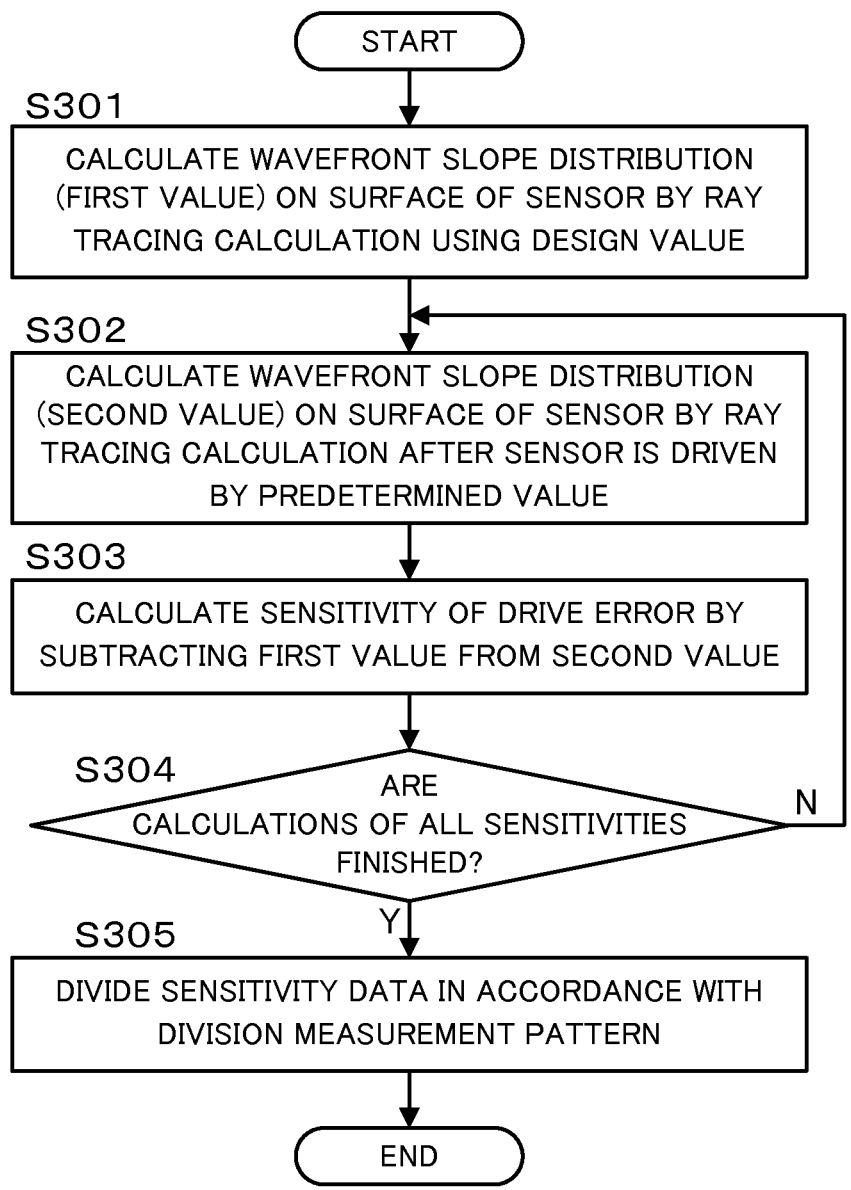
FIG. 3 is a flowchart of illustrating a method of generating sensitivity in Embodiment 1.
Figure 4:
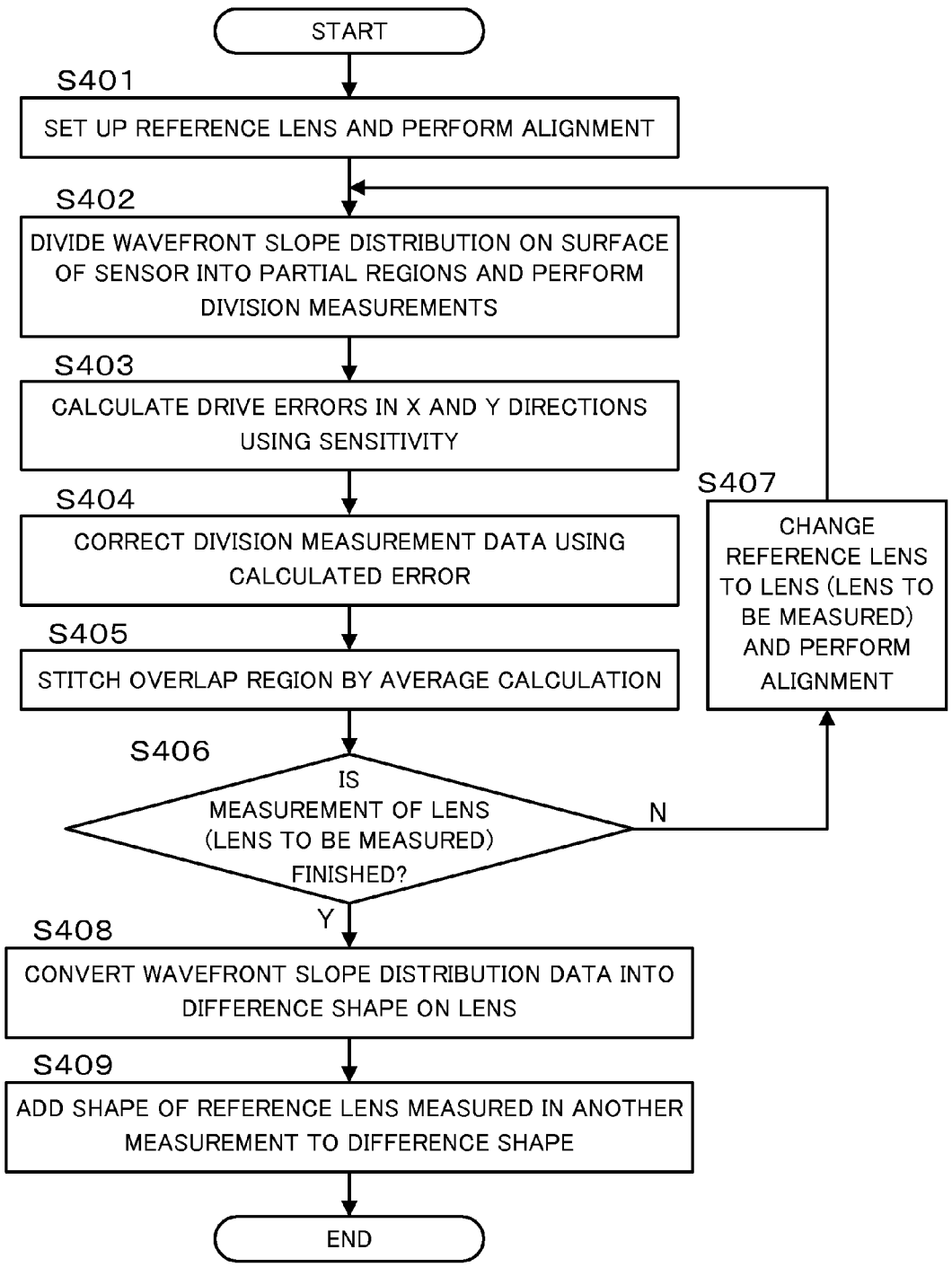
FIG. 4 is a flowchart of illustrating a surface shape measurement method in Embodiment 1.

Next, referring to flowcharts of FIGS. 3 and 4, the surface shape measurement method in the present embodiment will be described. The surface shape measurement method of the present embodiment divides a surface shape of the object into a plurality of partial regions to obtain the division measurement data (the partial region data), and then stitches these division measurement data to obtain the surface shape of the object. FIG. 3 is a flowchart of illustrating a method of making sensitivity in the present embodiment. FIG. 4 is a flowchart of illustrating a stitching method in the present embodiment. Each step illustrated in FIGS. 3 and 4 is performed based on an instruction of the analyzing processor 112 of the surface shape measurement apparatus 1.

In FIG. 3, first of all, in Step S301, performing the ray tracing calculation using the design values of the lens 107 (the lens to be measured) and the optical system, the wavefront slope distribution on the surface of the sensor 110 (the wavefront slope distribution data) is obtained. Subsequently, in Step S302, the wavefront slope distribution on the surface of the sensor 110 (the wavefront slope distribution data) is obtained after the sensor 110 is driven by a predetermined amount. In other words, the sensor 110 is driven by the predetermined amount in any one of X, Y, Z, θx, θy, and θz directions, and the wavefront slope distribution on the surface of the sensor 110 in this case is obtained by the ray tracing calculation.

Next, in Step S303, the sensitivity (the error sensitivity) is calculated. In other words, subtracting the wavefront slope distribution data calculated in Step S301 from the wavefront slope distribution data calculated in Step S302, the sensitivity of the drive error is calculated. Subsequently, in Step S304, for each of six-axis directions (six components) of the X, Y, Z, θx, θy, and θz directions, whether the calculation of the sensitivity is finished is determined. When the calculation of the sensitivity is not finished, the drive direction of the sensor 110 is changed, and Steps S302 to S304 are repeated so as to calculate all the sensitivities for the six components. On the other hand, when the calculation of the sensitivity is finished, the flow proceeds to Step S305, and the sensitivity calculated in Step S303 is divided in accordance with a lattice design. In other words, the sensitivity (sensitivity data) is divided in accordance with a division measurement pattern.

As described above, through Steps S301 to S305 illustrated in FIG. 3, the sensitivities for the six components can be obtained. In other words, through Steps S301 to S305, the sensitivity (the drive error) that is generated by the relative movement between the object (the lens 107) and the sensor 110 can be calculated for each partial region.

The sensitivity needs to be made each time of changing the design value of the reference lens 106 or the lattice design, but for example, the sensitivity may be made once if mass production lenses are continuously measured. Therefore, the load of making the sensitivity is not large. In the present embodiment, since the sensitivity is made by the ray tracing calculation, compared to a case where the sensitivity is made in the measurement apparatus 1, the measurement can be performed in a short time.

Next, the stitching measurement method of FIG. 4 will be described. In FIG. 4, first of all, in Step S401, the reference lens 106 is set up, and an alignment is performed. In other words, for the wavefront slope distribution that is measured after the reference lens 106 is set up, while a part of the coefficients for which the fitting has been performed by the differential Zernike polynomial is viewed, the positions of the reference lens 106 in the X, Y, and Z directions and rotation angles around the X and Y axes are adjusted by the driver 111 so that the part of the coefficients are converged in a predetermined amount.

Next, in Step S402, the wavefront slope distribution on the surface of the sensor 110 (the surface shape of the object) is divided into the plurality of partial regions so as to obtain the division measurement data (the partial region data). In other words, the sensor 110 is moved by the driver 111 in accordance with the previously set lattice design, and the division measurement data is obtained for each partial region (division position). In this case, an overlap region of two partial regions adjacent to each other of the plurality of partial regions is provided so as to obtain the division measurement data.

Subsequently, in Step S403, in accordance with the flowchart of the method of making the sensitivity illustrated in FIG. 3, using the previously calculated sensitivity, an amount corresponding to the drive error of the sensor 110 that is contained in the wavefront slope distribution on the surface of the sensor 110 in the X direction and the Y direction is calculated. In other words, using Expression (19) described above, the coefficient of each component that indicates the drive error is obtained. In this case, using the sensitivity, the amount corresponding to the error is calculated so that the error in the overlap region is minimized.

Next, in Step S404, using the amount corresponding to the calculated drive error, the division measurement data is corrected. In other words, substituting the coefficient obtained in Step S403 into Expression (20) described above, the division measurement data is corrected. Subsequently, in Step S405, joining (stitching) the corrected division measurement data, the surface shape of the object is calculated. In other words, the corrected division measurement data are stitched by performing the average calculation of the overlap region using Expression (22) described above, and thus the whole of the wavefront slope distribution data is calculated.

Next, in Step S406, whether the measurement of the lens 107 is finished is determined. When the measurement of the lens 107 is not finished, the flow proceeds to Step S407. In Step S407, the lens 107 is set up and the alignment is performed. In other words, after the reference lens 106 is removed and the lens 107 is set up, the position and the inclination of the lens 107 are adjusted using the alignment method that is similar to that of Step S401. After Step S407 is finished, in Step S402 to S405, the whole of the wavefront slope distribution data of the lens 107 is calculated. The Z position of the lens 107 may also be managed using for example another displacement measurement apparatus so as to be displaced from the position of the reference lens 106.

On the other hand, in Step S406, when the measurement of the lens 107 is finished, the flow proceeds to Step S408. In Step S408, the wavefront slope distribution data is converted into a difference shape on the object surface 107a. In other words, the wavefront slope distributions on the surface of the sensor 110 for the reference surface 106a and the object surface 107a are converted into the wavefront slope distribution on the conjugate plane with respect to the sensor 110, i.e. on the object surface 107a. In this case, when the conjugate plane with respect to the sensor 110 and the object surface 107a do not coincide with each other, the wavefront slope distribution is further converted by performing the ray tracing onto the object surface 107a. In addition, the difference of the wavefront slope distributions of the converted reference surface 106 and object surface 107a is calculated. Then, an integral processing is performed for the obtained difference wavefront slope distribution or the fitting is performed by the differential Zernike polynomial so as to calculate the difference shape as the coefficient. Subsequently, in Step S409, the shape data of the reference surface 106a (the reference lens 106) previously measured by another measurement method are added to the difference shape calculated in Step S408 so as to obtain the shape of the object surface 107a (the lens 107).

In the present embodiment, the division measurement data are assumed to be the wavefront slope distribution, but the embodiment is not limited to this. For example, the wavefront slope distribution may also be corrected and stitched after the wavefront slope distribution is converted into a wavefront or a shape (in this case, the division measurement data is the wavefront or the shape). In the present embodiment, the configuration in which the sensor 110 is driven by using the driver 111 is described, but the embodiment is not limited to this. Even when correcting the drive error in driving a sample (the reference lens 106 or the lens 107), the correction method similar to that of the present embodiment can also be applied. In this case, the sensitivity is made at a side of the object, and then the drive error of the object may be corrected. In the present embodiment, it is assumed that the difference measurement is performed using the reference surface 106a (the reference lens 106), but the embodiment is not limited to this. The measurement can also be performed using only the object surface 107a (the lens 107) without using the reference surface 106a. The division measurement data for the object surface 107a may also be calibrated using the division measurement data for a predetermined reference surface 106a.

According to the present embodiment, joining (stitching) division measurement data of wavefront slope distributions with high accuracy, a surface shape measurement apparatus and a surface shape measurement method capable of performing a non-contact measurement of a surface shape including an aspherical surface at high speed with high accuracy can be provided. In addition, performing a difference measurement, a drive error caused by a driver can be corrected without receiving an influence of a system error. Furthermore, performing a correction using sensitivity, a highly-accurate correction that is more than sub-pixel accuracy can be performed.

[Embodiment 2]

Figure 5:
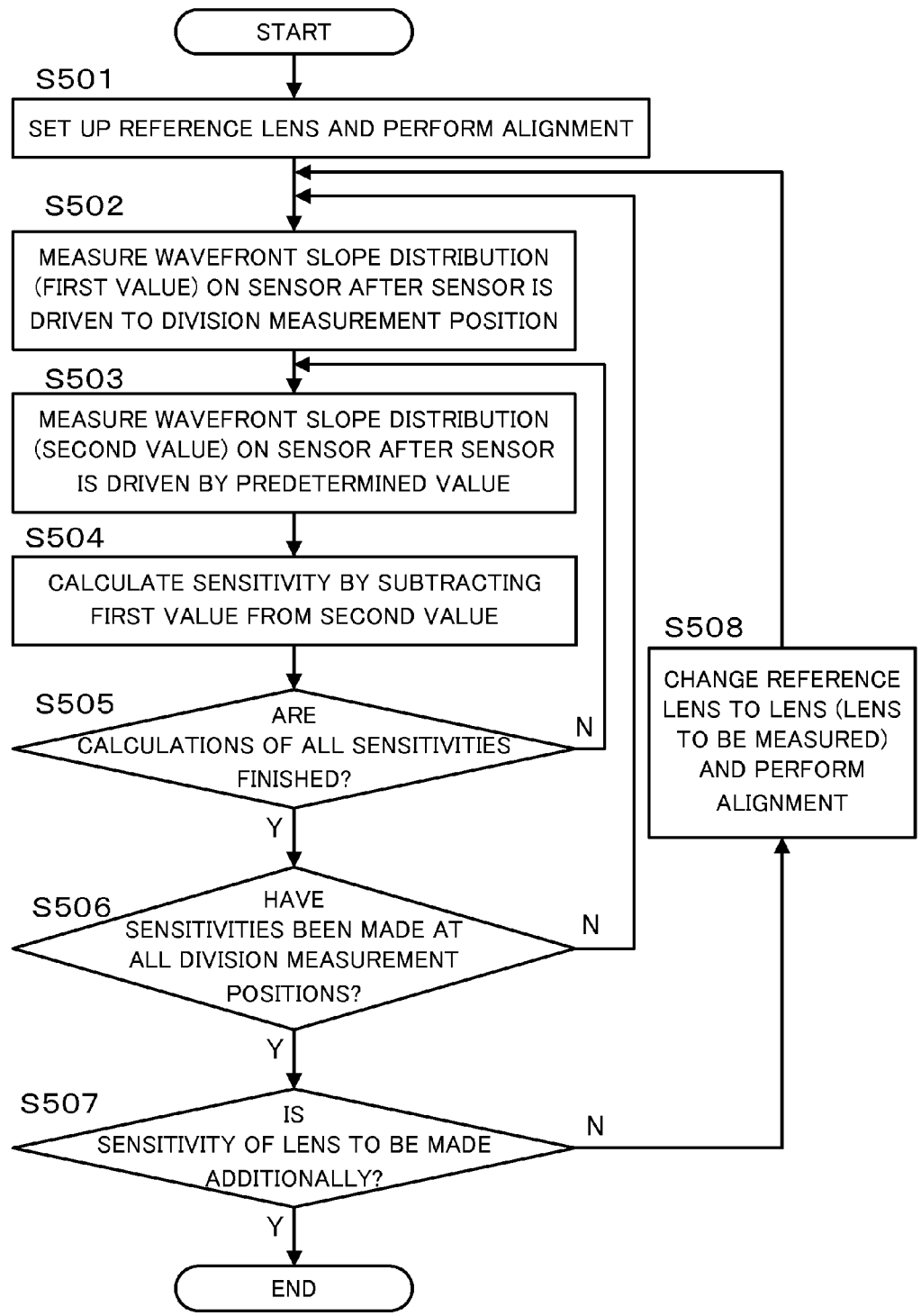
FIG. 5 is a flowchart of illustrating a method of generating sensitivity in Embodiment 2.

Next, referring to FIG. 5, Embodiment 2 of the present invention will be described. FIG. 5 is a flowchart of illustrating a method of making sensitivity in the present embodiment. The present embodiment is different from Embodiment 1 that makes the sensitivity by the calculation using the design value in that the sensitivity is measured and calculated in a measurement apparatus. In other words, the sensitivity of the present embodiment is calculated using a measured value that is obtained while the lens 107 and the sensor 110 are relatively moved. Other configurations are similar to those of Embodiment 1, and therefore descriptions of the configurations are omitted. Each step illustrated in FIG. 5 is, similarly to Embodiment 1, performed based on an instruction of the analyzing processor 112 of the measurement apparatus 1.

In FIG. 5, first of all, in Step S501, the reference lens 106 is set up and the alignment is performed. Subsequently, in Step S502, a division measurement of the wavefront slope distribution on the surface of the sensor 110 is performed. Steps S501 and S502 are similar to Steps S401 and S402 of Embodiment 1 respectively, and therefore detailed descriptions are omitted.

Next, in Step S503, the wavefront slope distribution on the surface of the sensor 110 is measured in the measurement apparatus 1 after the sensor 110 is driven by a predetermined amount. The present embodiment is different from Embodiment 1 in that the measurement is performed while the sensor 110 is actually driven, instead of calculating the wavefront slope distribution on the surface of the sensor 110 by the ray tracing calculation. Subsequently, in Step S504, subtracting the wavefront slope distribution measured in Step S502 from the wavefront slope distribution measured in Step S503, the sensitivity (the error sensitivity) is calculated. Step S504 is similar to Step S303 of Embodiment 1.

Next, in Step S505, whether the calculations of all the sensitivities (sensitivities for six components) are finished is determined. Step S505 is similar to Step S304 of Embodiment 1. When the calculations of all the sensitivities are not completed in Step S505, Steps S503 to S505 are repeated until the calculations of all the sensitivities are completed. On the other hand, when the calculations of all the sensitivities are completed in Step S505, the flow proceeds to Step S506.

In Step S506, whether the sensitivities are measured at all the division measurement positions of a previously set lattice design is determined. When the measurements of the sensitivities at all the division measurement positions are not completed in Step S506, Steps S502 to S505 are repeated and all the sensitivities of the six components are calculated at all the division measurement positions. In the present embodiment, since the sensitivities are calculated by measuring the sensitivities while driving the sensor 110 in the measurement apparatus 1, the division step of the sensitivity as indicated in Step S305 of Embodiment 1 after the difference calculation is not necessary. On the other hand, when the calculations of the sensitivities of all the division measurement positions are completed in Step S506, the flow proceeds to Step S507.

In Step S507, whether the sensitivity with respect to the lens 107 is also to be made is determined. This determination is performed based on required measurement accuracy or a measurement throughput as an index. When the sensitivity with respect to the lens 107 is to be made, the flow proceeds to Step S508, and the alignment is performed after the reference lens 106 is changed to the lens 107. Then, repeating Steps S502 to S506, the sensitivity with respect to the lens 107 is made. On the other hand, in Step S507, when the sensitivity with respect to the lens 107 is not to be made, the flow of FIG. 5 is finished. Thus, in the present embodiment, through Steps S501 to S508, the sensitivity of the error (the drive error) that is generated by the relative movement between the object (the lens 107) and the sensor 110 can be calculated for each partial region.

The method of measuring the shape of the object surface 107a using the sensitivity made in the present embodiment is similar to the flow of FIG. 4 described in Embodiment 1, and therefore the description of the method is omitted. However, when making the sensitivity with respect to the lens 107 is selected in Step S507, the sensitivity with respect to the reference lens 106 is used in measuring the reference lens 106, and the sensitivity with respect to the lens 107 is used in measuring the lens 107. On the other hand, when making the sensitivity with respect to the lens 107 is not selected, the sensitivity with respect to the reference lens 106 is used for the measurements of the reference lens 106 and the lens 107.

According to the present embodiment, since the sensitivity of the reference lens 106 is made in the measurement apparatus 1, the influence of the drive error can be corrected with higher accuracy. Therefore, the measurement accuracy of the surface shape can be further improved. When the sensitivity with respect to the lens 107 is used in measuring the lens 107, the shape measurement accuracy can be improved since a shape difference from the design value or the reference lens 106 is not a factor of the measurement error even if the shape difference is increased.

[Embodiment 3]

Figure 6:
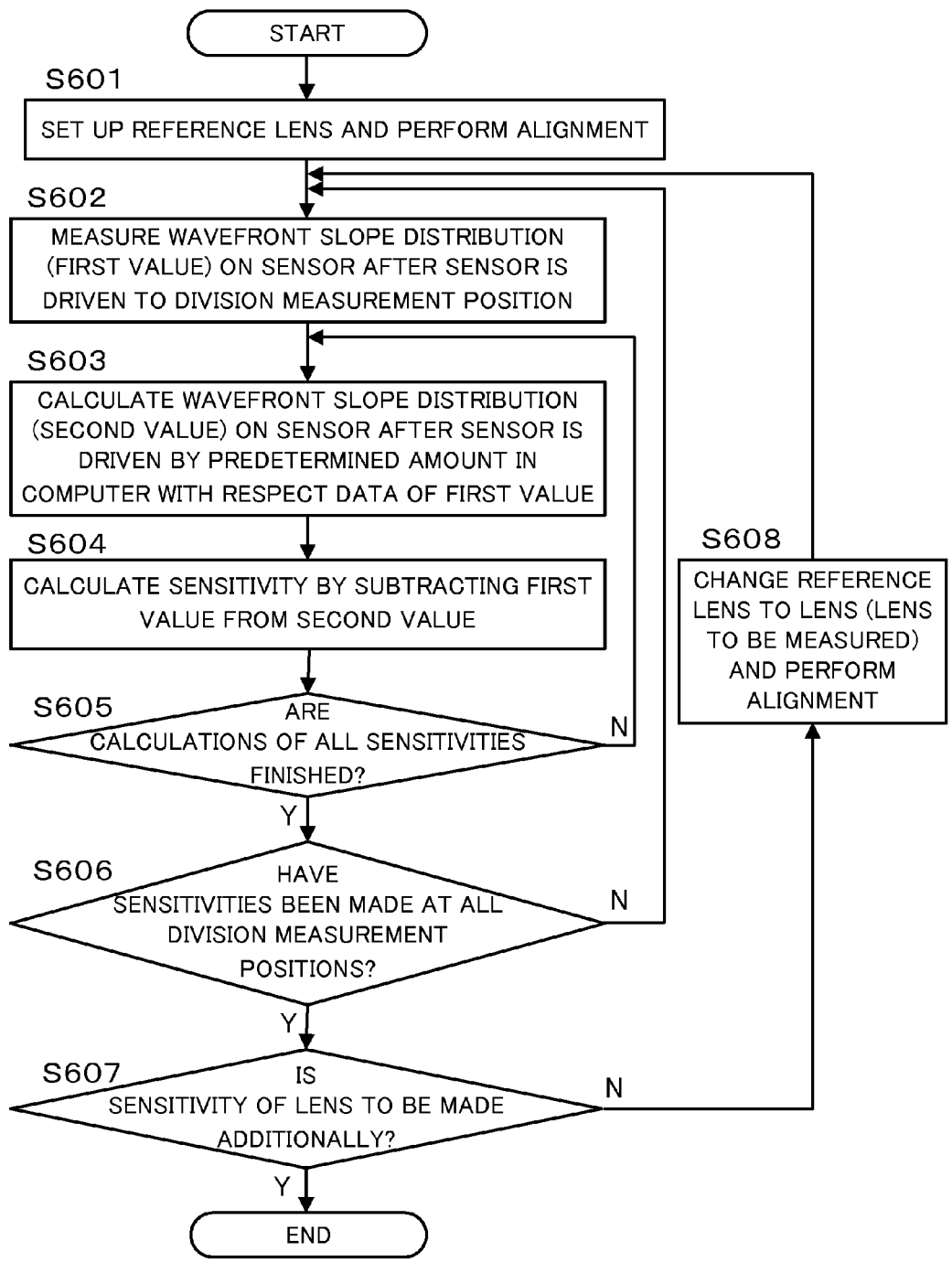
FIG. 6 is a flowchart of illustrating a method of generating sensitivity in Embodiment 3.

Next, referring to FIG. 6, Embodiment 3 of the present invention will be described. FIG. 6 is a flowchart of illustrating a method of making sensitivity in the present embodiment. The present embodiment performs division measurements of the wavefront slope distributions on the surface of the sensor 110 for the reference lens 106 and the lens 107 without performing a drive by a predetermined amount at a division measurement position so as to obtain data. Then, drive by the predetermined amount is given to the data in a computer so as to make the sensitivity. Thus, the present embodiment is different from Embodiment 1 or 2 in that the sensitivity is calculated by adding an error in the computer (an information processing apparatus). Other configurations are similar to those of Embodiment 1, and therefore descriptions of the configurations are omitted. Each step illustrated in FIG. 6 is, similarly to Embodiments 1 and 2, performed based on an instruction of the analyzing processor 112 of the measurement apparatus 1.

In FIG. 6, steps other than Step S603, i.e. Steps S601, S602, and S604 to S608, are the same as the steps of FIG. 5 described in Embodiment 2, i.e. Steps S501, S502, and S504 to S508, and therefore descriptions of the steps are omitted. In Step S603, the wavefront slope distribution on the surface of the sensor 110 after the sensor 110 is driven by a predetermined amount in the computer is calculated. In the present embodiment, through Steps S601 to S608, the sensitivity of the error (the drive error) generated by the relative movement between the object (the lens 107) and the sensor 110 can be calculated for each partial region.

Thus, the present embodiment is different from Embodiment 2 in which the sensor 110 is driven in the measurement apparatus 1 so as to measure the wavefront slope distribution in that the sensor 110 is driven in the computer so as to calculate the wavefront slope distribution. In order to provide an effect of the drive of the sensor 110 for the wavefront slope distribution on the surface of the sensor 110 in the computer, for example, a method of interpolating data in a coordinate system displaced by a predetermined amount or interpolating data in a rotated coordinate system is used. The method of measuring the shape of the object surface 107a using the sensitivity made in the present embodiment is the same as the flow of FIG. 4 described in Embodiment 1, and therefore descriptions of the method are omitted.

According to the present embodiment, reducing the load that is generated by measuring the data needed for the calculation of the sensitivity using the measurement apparatus, the measurement time can be shortened. In addition, the driver of the sensor 110 does not need six axes, and the drive can be configured only by X and Y stages.

[Embodiment 4]

Next, referring to FIGS. 7 and 8, Embodiment 4 of the present invention will be described. The sensitivity of the present embodiment is calculated in combination with the method of making the sensitivity in Embodiments 1 to 3. In other words, with respect to the reference lens 106 and the lens 107, each component of the sensitivities of the six components is individually selected from the methods of making the sensitivity of Embodiments 1 to 3 to be made. A flow of making the sensitivity of the present embodiment is the same as that of Embodiments 2 and 3, and therefore descriptions of the flow are omitted.

In the present embodiment, the step of calculating the data necessary for the calculation of the sensitivity is selected from the steps in Embodiments 1 to 3 in accordance with each component of the sensitivity. In other words, the steps to be adopted are set to be selectable for each component from among the Steps S302 and S303 of FIG. 3 (Embodiment 1), the Steps S502 and S503 (Embodiment 2), and the Steps 602 and S603 (Embodiment 3).

According the present embodiment, for example, when the number of axes of the driver 111 of the sensor 110 is fixed or the number of axes needs to be reduced, combined with the method of making the sensitivity with software, the cost of the measurement apparatus can be reduced and also the drive errors in all components can be corrected.

[Embodiment 5]

Next, referring to FIGS. 7 and 8, Embodiment 5 of the present invention will be described. FIG. 7 is a configuration diagram of a manufacturing apparatus of an optical element in the present embodiment. FIG. 8 is a configuration diagram of a manufacturing apparatus of an optical element as another example of the present embodiment. The manufacturing apparatuses illustrated in FIGS. 7 and 8 process the object surface 107a of the optical element based on measurement data obtained using the surface shape measurement method in any of Embodiments 1 to 4 so as to manufacture the optical element.

In the present embodiment, the optical element is manufactured through the following three steps. In a first step, a whole of a surface shape is measured by the stitching method in any of Embodiments 1 to 4. In a second step, revised processing data are made based on a difference between the measurement data and an ideal processing shape. In a third step, the revised processing is performed by a processing apparatus based on the revised processing data. Repeating the above three steps until a required accuracy is satisfied, an optical element such as a lens with a large diameter which could not easily manufactured in a conventional technology can be manufactured with high accuracy.

Figure 7:
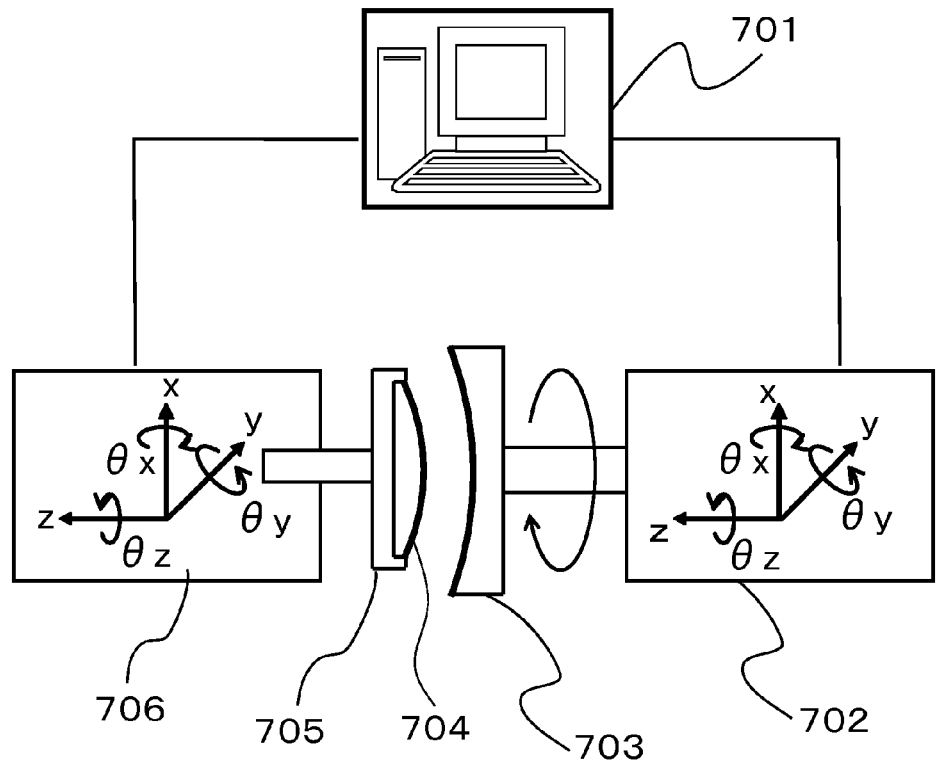
FIG. 7 is a configuration diagram of a manufacturing apparatus of an optical element in Embodiment 5.

In FIG. 7, reference numeral 701 denotes a computer (an information processing apparatus), reference numeral 702 denotes a driver for a stage or the like, and reference numeral 703 denotes a tool such as a polishing plate that contacts the optical element so as to process a shape of the optical element. Reference numeral 704 denotes the optical element such as a lens, reference numeral 705 denotes a tool that fixes the optical element 704, and reference numeral 706 denotes a driver capable of fixing the tool 705.

The computer 701 reads the measurement data obtained using the surface shape measurement method in any of Embodiments 1 to 4, and calculates the difference from the ideal processing shape based on the measurement data so as to generate processing data. In accordance with the processing data, the computer 701 sends a command that drives a position or an inclination of the tool 703 to the driver 702 or the driver 706. Changing the relative position between the tool 703 and the optical element 704 while contacting a processing surface of the tool 703 with a surface to be processed of the optical element 704, the surface shape of the optical element 704 can be processed.

Figure 8:
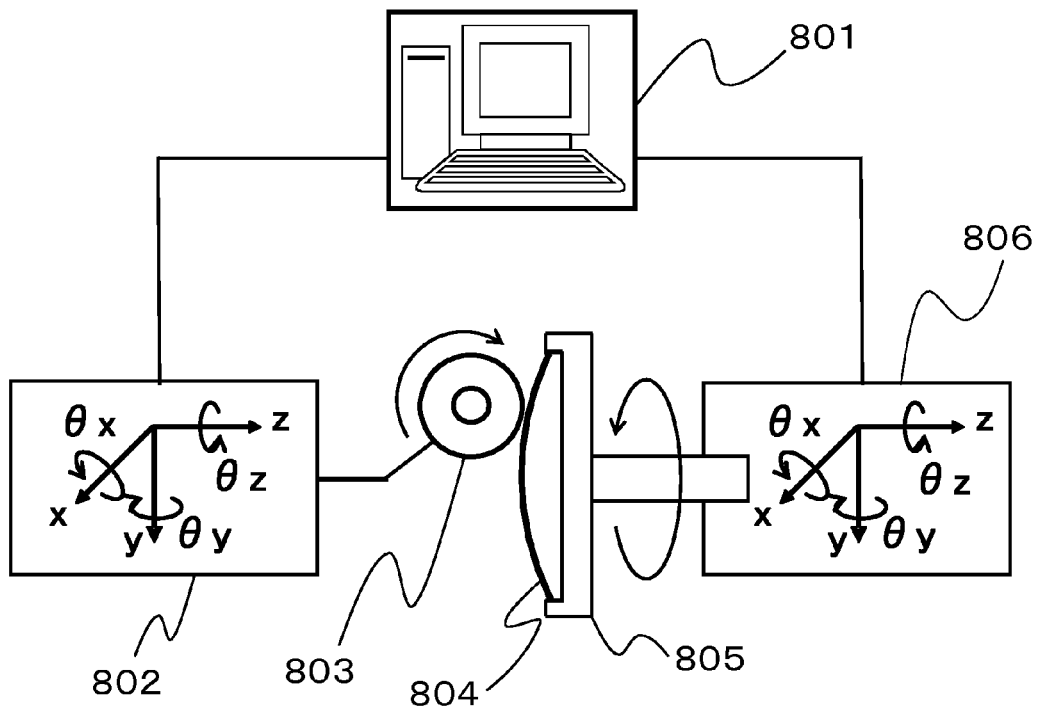
FIG. 8 is a configuration diagram of a manufacturing apparatus of an optical element as another example in Embodiment 5.

In FIG. 8, reference numeral 801 denotes a computer (an information processing apparatus), reference numeral 802 denotes a driver for a stage or the like that adjusts a position or an inclination of a processing portion, and reference numeral 803 denotes a tool that contacts the optical element so as to locally process a shape of the optical element. Reference numeral 804 denotes the optical element such as a lens, reference numeral 805 denotes a tool that fixes the optical element 804, and reference numeral 806 denotes a driver capable of fixing the tool 805.

The computer 801 generates the processing data similarly to FIG. 7. In accordance with the processing data, the computer 801 sends a command that drives a position or an inclination of the tool 803 to the driver 802 or the driver 806. Changing the relative position between the tool 803 and the optical element 804 while contacting a processing portion of the tool 803 with a portion to be processed of the optical element 804, the surface shape of the optical element 704 can be locally processed.

According to each of the embodiments described above, a surface shape measurement apparatus and a surface shape measurement method that measure a surface shape of an optical wavefront or an optical element with large diameter (an object to be measured) which exceeds a measurement range of a sensor with high accuracy can be provided simply at low cost. In other words, correcting an error generated by the relative movement between the object and the sensor before performing the stitching, the surface shape of the object can be measured with high accuracy. In addition, a computer program that causes the information processing apparatus to execute the surface shape measurement method in each embodiment described above, a non-transitory computer-readable storage medium that stores the computer program for causing an information processing apparatus to execute the surface shape measurement method, an optical element that is manufactured with high accuracy using the surface shape measurement method, and a method of manufacturing the highly-accurate optical element can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In each of the embodiments described above, a lens is used as an object (an object to be measured), but the embodiment is not limited to this, and a mirror, a mold, or another object that has a shape similar to the lens may also be applied.

This application claims the benefit of Japanese Patent Application No. 2012-023974, filed on Feb. 7, 2012, which is hereby incorporated by reference herein in its entirety.

What is claimed is:

1. A surface shape measurement method for measuring a surface shape of an object, the method comprising the steps of:
dividing, using a processor, the surface shape of the object into a plurality of partial regions;
obtaining, from a sensor, partial region data regarding the surface shape of the object for each partial region;
calculating, using the processor, sensitivities of the partial region data with respect to relative movements between the object and the sensor for the partial regions;
calculating, using the processor, amounts corresponding to errors generated by the relative movements using the calculated sensitivities;
correcting, using the processor, the partial region data using the calculated amounts corresponding to the errors; and
stitching, using the processor, the corrected partial region data to determine the surface shape of the object,
wherein each of the sensitivities is a sensitivity of a wavefront slope distribution on the sensor with respect to a relative drive error between the object and the sensor, and
wherein each of the sensitivities is calculated based on a difference between data determined before and after the relative movement between the object and the sensor by a predetermined amount.

2. The surface shape measurement method according to claim 1, wherein each of the sensitivities is calculated based on a difference between the wavefront slope distributions determined before and after the relative movement between the object and the sensor by the predetermined mount, which is a unit amount.

3. The surface shape measurement method according to claim 1, wherein a wavefront or a wavefront slope distribution of light from an object surface of the object is measured via an optical system in which a conjugate plane with respect to the sensor and the object surface coincide with each other, and the partial region data are calculated using a position magnification distribution on the conjugate plane of the sensor or both the position magnification distribution and an angle magnification distribution.

4. The surface shape measurement method according to claim 3, wherein the partial region data are calculated by performing a ray tracing calculation from the conjugate plane to the object surface when the conjugate plane with respect to the sensor and the object plane do not coincide with each other.

5. The surface shape measurement method according to claim 1, wherein each of the errors contains at least one of position errors in X, Y, and Z directions and rotation errors around X, Y, and Z axes with respect to the object or the sensor.

6. The surface shape measurement method according to claim 1, wherein each of the sensitivities is calculated by performing a ray tracing calculation using design values of an object surface and an optical system.

7. The surface shape measurement method according to claim 1, wherein each of the sensitivities is calculated using a measured value that is obtained by relatively moving the object or the sensor.

8. The surface shape measurement method according to claim 1, wherein each of the sensitivities is calculated by adding the error using the processor.

9. The surface shape measurement method according to claim 1, wherein each of the sensitivities is calculated in combination with at least two of performing a ray tracing calculation using design values of an object surface and an optical system, using a measured value that is obtained by relatively moving the object or the sensor, and adding the error using the computer.

10. The surface shape measurement method according to claim 1, wherein:
the partial region data are obtained by providing an overlap region of two partial regions adjacent to each other of the plurality of partial regions, and
the amounts corresponding to the errors are calculated using the calculated sensitivities so that an error in the overlap region is minimized.

11. The surface shape measurement method according to claim 1, wherein partial region data with respect to an object surface of the object is calibrated using partial region data with respect to a predetermined reference surface.

12. A surface measurement apparatus for measuring a surface shape of an object, the surface measurement apparatus comprising:
a sensor configured to receive reflected light obtained by illuminating light onto the object via an optical system; and
a processor configured to divide the surface shape of the object into a plurality of partial regions
wherein the sensor is configured to obtain partial region data regarding the surface shape of the object for each partial region, and wherein the processor is further configured to:
calculate sensitivities of the partial region data with respect to relative movements between the object and the sensor for the partial regions;
calculate amounts corresponding to errors generated by the relative movements using the calculated sensitivities;
correct the partial region data using the calculated amounts corresponding to the errors; and
stitch the corrected partial region data to determine the surface shape of the object,
wherein each of the sensitivities is a sensitivity of a wavefront slope distribution on the sensor with respect to a relative drive error between the object and the sensor, and
wherein the processor is configured to calculate each of the sensitivities based on a difference between data determined before and after the relative movement between the object and the sensor by a predetermined amount.

13. A non-transitory computer-readable storage medium that stores a program executable by a processor of an information processing apparatus to execute a surface shape measurement method for measuring a surface shape of an object, the surface shape measurement method comprising the steps of:
dividing the surface shape of the object into a plurality of partial regions;
obtaining, from a sensor, partial region data regarding the surface shape of the object for each partial region,
calculating sensitivities of the partial region data with respect to relative movements between the object and the sensor for the partial regions;
calculating amounts corresponding to errors generated by the relative movements using the sensitivities;
correcting the partial region data using the calculated amounts corresponding to the errors; and
stitching the corrected partial region data to determine the surface shape of the object,
wherein each of the sensitivities is a sensitivity of a wavefront slope distribution on the sensor with respect to a relative drive error between the object and the sensor, and
wherein each of the sensitivities is calculated based on a difference between data determined before and after the relative movement between the object and the sensor by a predetermined amount.

14. A method of manufacturing an optical element that is manufactured by processing an object surface of the object based on measurement data obtained using the surface shape measurement method according to claim 1.

* * * * *